Sept. 1, 1925. 1,551,715
B. H. URSCHEL
SHAFT STRAIGHTENING AND TESTING MACHINE
Filed Dec. 12, 1921 4 Sheets-Sheet 3
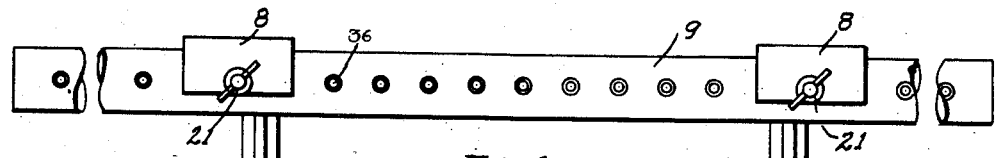
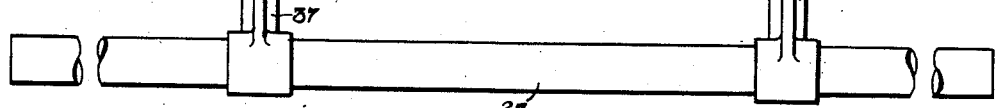
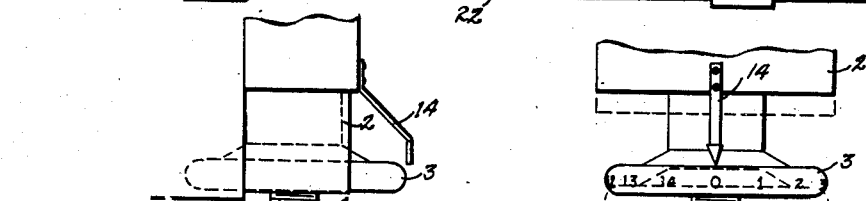
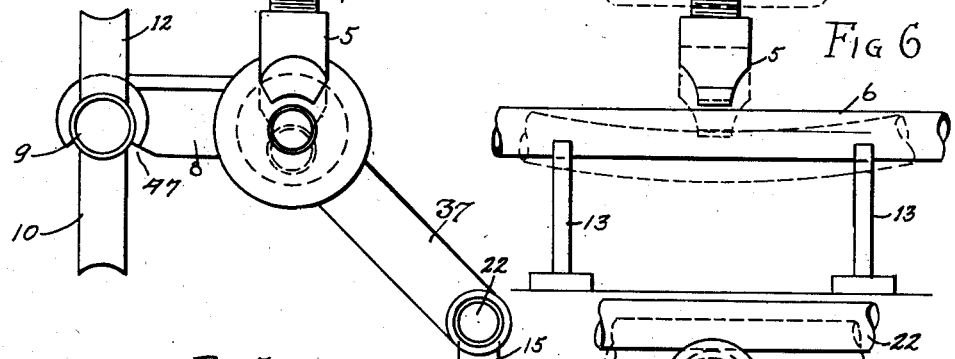
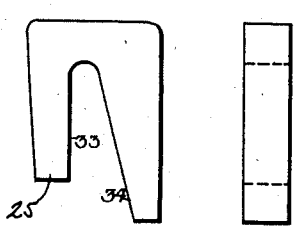

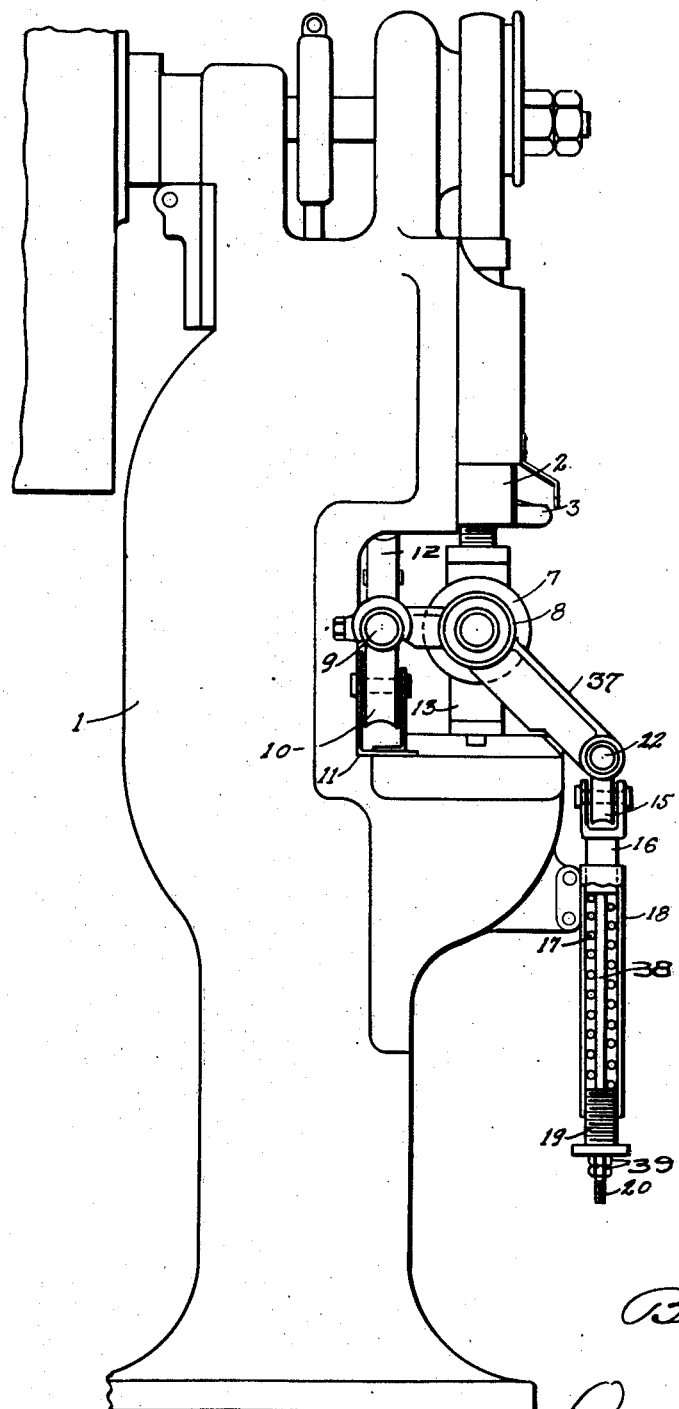

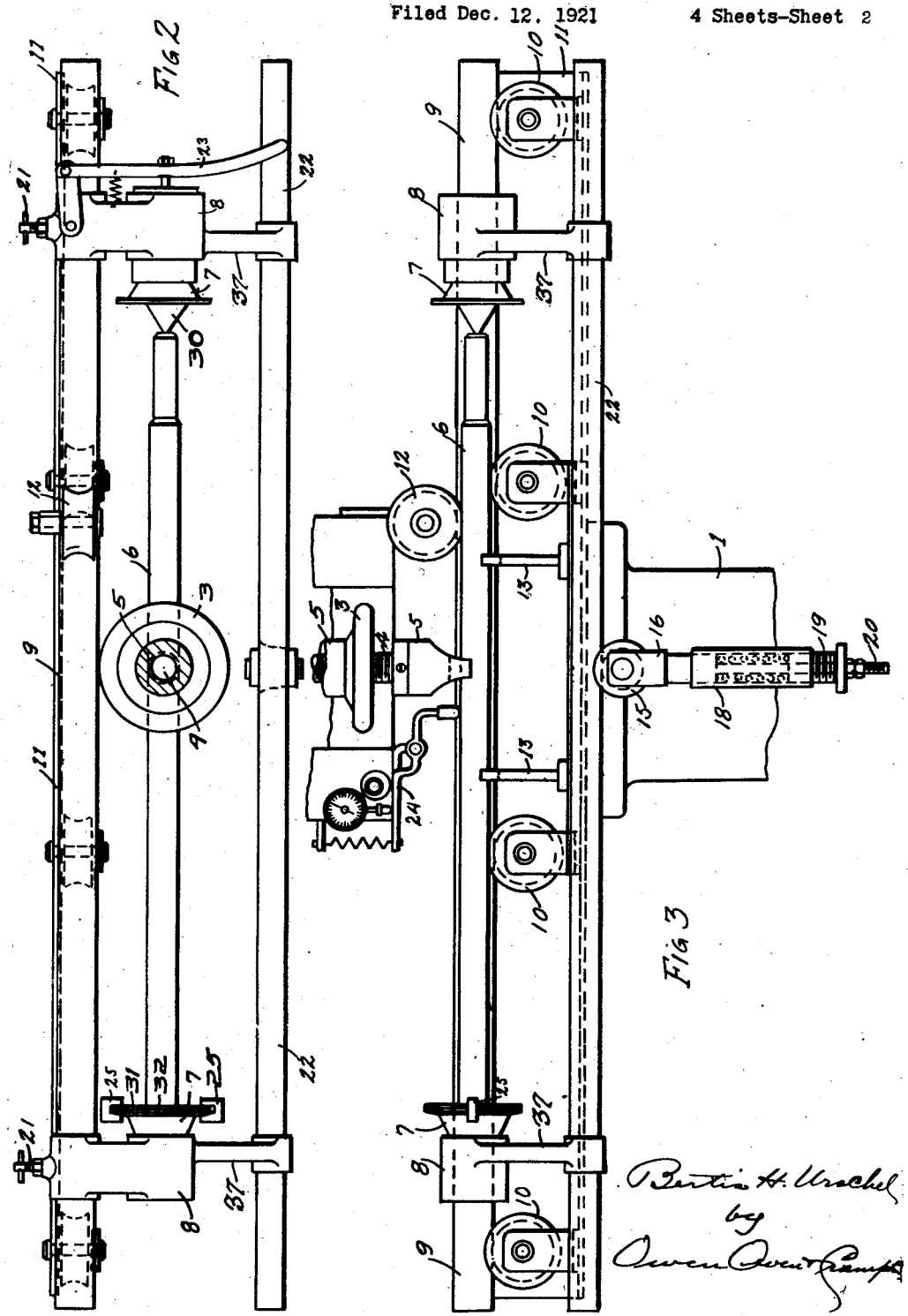

Patented Sept. 1, 1925.

1,551,715

UNITED STATES PATENT OFFICE.

BERTIS H. URSCHEL, OF BOWLING GREEN, OHIO.

SHAFT STRAIGHTENING AND TESTING MACHINE.

Application filed December 12, 1921. Serial No. 521,588.

*To all whom it may concern:*

Be it known that I, BERTIS H. URSCHEL, a citizen of the United States, and a resident of Bowling Green, in the county of Wood and State of Ohio, have made an Invention Appertaining to a Shaft Straightening and Testing Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide an efficient straightening machine for shafts and the like wherein a testing means may be provided which will indicate the eccentricity of the shaft or rod or other similar device. Machines involving my invention provide means whereby the shaft may be freely rotated in operative relation to a testing machine and readily placed in position with reference to bending parts of the machine without modifying the position or condition of the shaft as to its rotative relation to the testing machine, the shaft supporting part of the machine being so constructed that it will readily adjust itself without injury or damage during the bending operation. The invention thus provides a means whereby the eccentricity may be readily determined and removed and the shaft again tested at other points for eccentricity which may be likewise eliminated.

The invention may be contained in structures of different forms. To illustrate a practical application of the invention I have selected a construction containing the invention and shall describe it hereinafter. The structure selected as an example is shown in the accompanying drawings.

Figure 10:
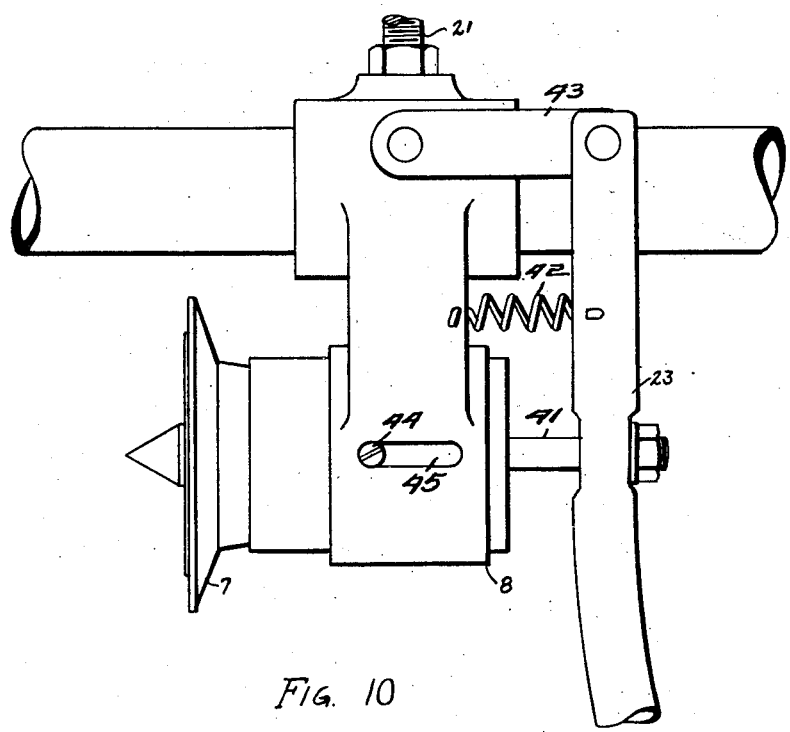
Figures 11, 12:
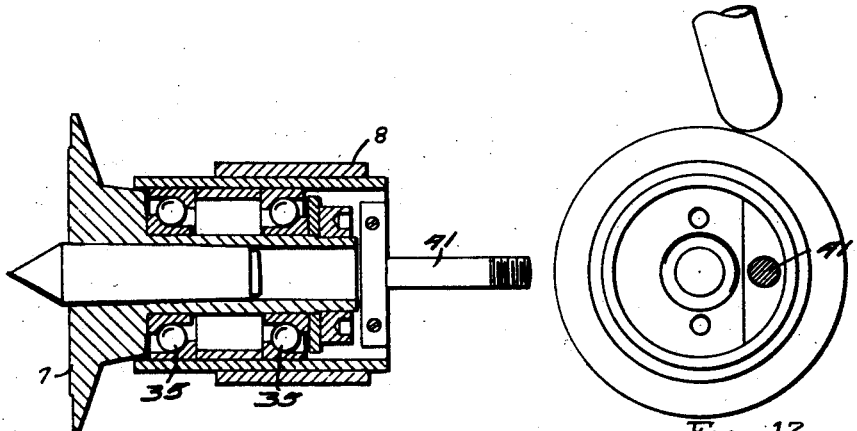

Figure 1 of the drawings illustrates an end view of the machine. Fig. 2 illustrates a top view of the means for supporting the shaft or other object to be straightened. Fig. 3 is a front view of the parts illustrated in Fig. 2. Fig. 4 is a view showing the under side of parts of the mechanism shown in Fig. 2. Fig. 5 is an end view similar to that shown in Fig. 1 illustrating parts of the mechanism. Fig. 6 is a front view of a part of the mechanism shown in Fig. 3. Fig. 7 illustrates a part of the mechanism shown in Fig. 3. Fig. 8 is a side view of a clamp for securing flanged shafts to one of the supporting collets. Fig. 9 is an edge view of the clamp shown in Fig. 8. Fig. 10 is a side view of a supporting spindle or collet. Fig. 11 is a sectional view of the collet shown in Fig. 10, and Fig. 12 is an end view of the collet shown in Fig. 11.

1, Fig. 1, is the supporting frame of an ordinary trip plunger press having the usual ram 2 and which is foot-controlled in the manner well known in connection with such presses. The article to be straightened is supported beneath the ram so as to be acted upon. The testing means for testing the eccentricity of the shaft and the means for shifting the shaft or the like to be straightened are supported on the frame of the press.

The ram 2 is provided with a hand wheel 3 that may be rotated to locate the position of the head 5 relative to the ram 2. The head 5 is provided with a threaded shank 4 and rotation of the head 5 and shank 4 is prevented, while rotation of the wheel 3 adjusts the position of the head 5 relative to the ram 2 since the threaded shank 4 extends into the hub of the wheel 3. The head 5 may be of any suitable shape but it is preferably provided with a portion having a cylindrical surface that may conform somewhat to the cylindrical surface of the shaft to be straightened.

The shaft or other article to be straightened is supported beneath a head 5 and so as to be engaged by the head 5 when the ram is depressed by the operation of the machine. The shaft 6 may be hollow and provided with a flange at one end. It is supported at one end by the flanged collet 7 and in substantial axial alignment with the collet. At the other end it is supported by means of the spindle 30 which is supported in the collet 7. If the shaft 6 is of a length too great to be placed between the extreme adjustable positions of the collet 7 it may extend through one or both of the collets 7 and the portions between the collets straightened and subsequently remounted in the collets to straighten other portions of the shaft.

At one end the shaft 6 is secured by the tip of the spindle which enters the end of the shaft. At the other end the flange 31 is secured to the flange 32 of the collet by means of wedging clamps 25 that have opposing clamping surfaces 33 and 34. The surface 33 engages the flat side of the flange 31. The surface 34 and the flange 32 are inclined relative to the surfaces of the flange and the surface 33 of the clamp. When, therefore, the clamps 25 are placed at different points around the peripheries of the flanges 31 and 32 and forced with some pressure towards the axis of the shaft they will be frictionally held in position and thus clamp the flanges together and readily secure the flanged end of the shaft 6 in position.

The collets being supported for rotation in the manner well known in the art, as by the ball bearings 35, the shaft 6 may be freely rotated by hand or by any other means. The collets are supported in frames 8 that are adjustably connected to the shaft or bar 9. The shaft 9 is provided with a plurality of tapered openings 36 and the frames 8 are provided with tapered pins 21 that thread into the frames 8 and may enter any one of the openings 36 formed in the shaft 9. Thus the frames 8 may be shifted to positions along the shaft 9 and securely held in any one of the positions by means of the screws 21.

A shaft 22 is also connected to the frames 8 by means of the arms 37. The frames 8 may also be shifted relative to the shaft 22 but the frictional contact between the shaft 22 which is located in the ends of the arms 37 will maintain the shaft 22 in position relative to the frames 8.

The frame, that is thus formed by the shafts 9 and 22 and the frames 8, constitutes a carriage for supporting the shaft 6 to be straightened, the shaft 6 being mounted so that it will be freely rotated in the carriage. The carriage thus formed is supported by the grooved rollers 10 and 15. The rollers 10 are located at different points along the under side of the shaft 9. As shown in Fig. 3, four such rollers are provided, cutaway portions being formed on the under sides of the frames 8 as shown in Fig. 5 to permit the frames 8 to freely pass over the rollers 10. In order that the shaft 9 may be held for pivotal movements of the carriage a roller 12 may be connected to the frame 1 in proximity to the head 5. Preferably but one roller 12 is used in order to permit either of the frames 8 to approach comparatively close to the head 5 of the ram.

The shaft 22 rests on the roller 15 which is elastically held in position by the spring 17. The spring 17 is located between the shank 16 and the plug 19. The shank 16 is slidable in the sleeve 18 in which the spring 17 is located and the plug 19 is threaded into the sleeve 18. The spring 17 surrounds the rod 20 that is secured in the shank 16. The rod 20 is provided with nuts 39, whereby the position of the roller 15 may be adjusted and also the tension of the spring 17 may be adjusted to yieldingly resist the downward movement of the shaft 22. The sleeve 18 may be connected to the frame 1 by a suitable bracket. Thus the carriage is supported in such position that it may be shifted longitudinally and so as to place any part of the shaft 6 beneath the head 5.

In order to bend any desired portion of the shaft 6, a pair of anvils 13 are placed on the bed of the press and on opposite sides of the head 5. The anvils 13 are provided with concave surfaces that conform more or less to the cylindrical surface of the shaft to be straightened. The shaft is placed over the concave surfaces of the anvils and slightly remote therefrom, that is, slightly above the concave surfaces. When therefore the plunger is depressed the carriage is moved downwardly, it being rotated about the axis of the shaft 9, until the shaft to be straightened is placed against the upper ends of the anvils 13. This downward movement is opposed by the action of the spring 17. On further downward movement of the head 5 the portion of the shaft 6 between the anvils 13 is depressed downward, while the portions outside of the anvils 13, that is, the end portions of the shaft 6, are raised, which causes the frames 8 and the shaft 22 to be raised. The grooved wheel 15 follows the upward movement of the shaft 22 at least during a part of its upward movement and upon the return movement of the head 5 the carriage pivots on the axis of the shaft 9 in a return movement to make a downward movement of the shaft 22 until the head 5 releases the shaft 6 from contact with the anvils 13, whereupon an upward movement of the shaft 22 and of the carriage will occur. The movement of the ram 2 however is a quick, forceful movement and the movements in the shafts take place with great rapidity, so that the spring 17 cushions the effect of the stroke of the plunger press of the carriage, as the effect of the impacts produced both on the downward stroke and the return stroke of the press is to produce downward movements of the shaft 22 and of the carriage, as indicated in Figs. 6 and 7.

A micrometric indicator of any well-known type may be used to indicate any position of any part of the surface of the shaft relative to the axis of the collets or centering spindles. Rotation of the shaft not in axial alinement with the collets and longitudinal movement of the shaft will indicate at once its condition of eccentricity. The point that actuates the indicator 24 is preferably located in proximity to the head 5 to indicate the degree of eccentricity to enable the operator to so rotate the shaft 6 that the maximum degree of eccentricity of this portion of the shaft will be placed substantially under the head 5. The operator will then adjust the head 5 relative to the plunger by the rotation of the wheel 3 to bring the head 5 in such a position that it will force the shaft 6 down and bend the portion located between the anvils 13. To indicate to the operator the position of the head 5 relative to the ram, the wheel 3 may be indexed and the pointer 14 may be located in proximity thereto to indicate the position of the wheel. The operator can then very readily adjust the head 5 according to the indications read from the micrometic indicator 24.

For convenience of securing the shaft 6 in position one of the collets may be connected to the rod 41 and a lever 23 is connected to the rod 41. A spring 42 operates to pull the lever 23 towards the frame 8. The lever 23 may be pivoted to the frame 8 or to an arm 43 extending therefrom. When it is desired to release one end of the shaft 6 the lever 23 is pulled away from the frame 8 against the tension of the spring 42, which will draw the spindle from the end of the shaft. A screw or pin 44 is secured in the collet and extends into a slot 45 formed in the frame 8, which limits the extent of the movement of the collet relative to the frame.

I claim:

1. In a straightening means for shafts and the like, a carriage comprising a pair of frames and a pair of shafts, means for adjustably securing the frames to one of the shafts, grooved rollers for supporting the shafts, the object to be straightened pivotally supported in the frames.

2. In a straightening means for shafts and the like, a carriage comprising a pair of frames and a pair of shafts, means for adjustably securing the frames to one of the shafts, grooved rollers for pivotally supporting the carriage, and a shock absorbing means connected to one of the shafts, the frames having means for pivotally supporting the object to be straightened.

3. In a straightening means for shafts and the like, a carriage comprising a pair of shafts and a pair of frames, means for adjustably connecting the frames to one of the shafts, the frames having means for rotatively supporting the object to be straightened, a plunger, a head adjustably connected to the plunger, a pair of anvils located below the object to be straightened and normally out of contact with the object.

In testimony whereof, I have hereunto signed my name to this specification.

BERTIS H. URSCHEL.